(12) United States Patent
Erickson et al.

(10) Patent No.: US 12,132,387 B2
(45) Date of Patent: Oct. 29, 2024

(54) HIGH DENSITY INTERLEAVED INVERTER

(71) Applicants: Brek Electronics Inc., Broomfield, CO (US); The Regents of the University of Colorado, a body Corporate, Denver, CO (US)

(72) Inventors: Robert Erickson, Boulder, CO (US); Aaron Rogers, Longmont, CO (US); Roger Bell, Morrison, CO (US)

(*) Notice: Subject to any disclaimer, the term of this patent is extended or adjusted under 35 U.S.C. 154(b) by 163 days.

(21) Appl. No.: 17/629,066

(22) PCT Filed: Jul. 22, 2020

(86) PCT No.: PCT/US2020/043122
§ 371 (c)(1),
(2) Date: Jan. 21, 2022

(87) PCT Pub. No.: WO2021/016382
PCT Pub. Date: Jan. 28, 2021

(65) Prior Publication Data
US 2022/0278602 A1  Sep. 1, 2022

Related U.S. Application Data

(60) Provisional application No. 62/877,287, filed on Jul. 22, 2019.

(51) Int. Cl.
*H02M 7/48* (2007.01)
*H02M 1/00* (2006.01)
*H02M 7/5387* (2007.01)

(52) U.S. Cl.
CPC ....... *H02M 1/0043* (2021.05); *H02M 1/0058* (2021.05); *H02M 1/0085* (2021.05);
(Continued)

(58) Field of Classification Search
CPC ............. H02M 1/0043; H02M 1/0009; H02M 1/0085; H02M 1/0058; H02M 7/4807; H02M 7/5387
See application file for complete search history.

(56) References Cited

U.S. PATENT DOCUMENTS 9,344,005 B2 * 5/2016 Ho ........................... H03B 1/00
9,641,098 B2 * 5/2017 Fu ....................... H02M 7/4837
(Continued)

FOREIGN PATENT DOCUMENTS

CA  3005583 A1 * 11/2019
EP  3174190 A1  5/2017

*Primary Examiner* — Adolf D Berhane
(74) *Attorney, Agent, or Firm* — Thomas J. Osborne, Jr.; FisherBroyles, LLP

(57) ABSTRACT

Inverters that interface dc and ac power sources and loads are provided. An example application is solar power systems, in which a dc source of power is an array of solar panels; the inverter converts the dc power supplied by these panels to ac power that is fed into the utility grid. Another example is battery energy storage; the inverter changes the dc power of the batteries into ac power that is fed into the grid, and also can convert (rectify) ac power from the grid for charging the batteries. In one embodiment, for example, an inverter comprises slow switches that generate a three-level ac voltage, followed by a plurality of fast-switching half-bridges that introduce high-frequency pulse-width modulation into a plurality of ac output voltages.

23 Claims, 15 Drawing Sheets

(52) U.S. Cl.
CPC ......... *H02M 1/009* (2021.05); *H02M 7/4807* (2013.01); *H02M 7/53871* (2013.01)

(56) References Cited

U.S. PATENT DOCUMENTS

| | | | |
|---|---|---|---|
| 10,924,031 B2* | 2/2021 | Li | H02M 7/5387 |
| 11,557,983 B2* | 1/2023 | Zmood | H02M 7/23 |
| 11,716,032 B2* | 8/2023 | Xu | H02M 1/32 |
| | | | 363/98 |

* cited by examiner

HIGH DENSITY INTERLEAVED INVERTER

CROSS-REFERENCE TO RELATED APPLICATIONS

This application claims the benefit of U.S. provisional application No. 62/877,287, filed 22 Jul. 2019, which is hereby incorporated by reference as though fully set forth herein.

FIELD

The present disclosure relates to DC-AC inverters having high power density, including string inverters for photovoltaic power applications and inverters that interface batteries or other dc elements to the grid.

BACKGROUND

In large field-scale solar power installations, two types of inverter are in common use. The central inverter has a high power rating, often several megawatts. Because of its large size and weight, it commonly is mounted on a concrete pad using a crane. In contrast, the string inverter has a smaller power rating, tens of kilowatts to approximately 125 kW, with size and weight that allow it to be manually installed. Central inverters exhibit the lowest initial cost per rated watt because of their economies of scale, while string inverters are simpler and less expensive to install and maintain.

It would be advantageous to increase the power ratings of string inverters, to reduce their cost through economies of scale while maintaining their ability to be manually installed. This could be achieved by increasing their power density, i.e., their rated power per unit weight and per unit volume. It also would be advantageous to reduce the size and cost of the reactive elements of inverters. Inverters employing IGBTs commonly operate with switching frequencies in the vicinity of 10 kHz, limited by the switching speed and associated switching loss of the IGBTs. The reactive elements (filter inductors and capacitors) at 10 kHz are quite large and costly, and usually require manual insertion in assembly.

String inverters typically employ silicon insulated-gate bipolar transistors (Si IGBTs) that switch at frequencies in the range 1-10 kHz, or at most a few 10s of kHz. They employ conventional wound magnetics as filter elements, whose size is dependent on this switching frequency. To improve inverter power density, it is desired to increase the switching frequency, but this is beyond the capabilities of Si IGBTs. FIG. 1 illustrates the power circuitry of one phase of a well-known neutral-point-clamped three-level inverter circuit employing Si IGBTs. This circuit includes positive dc input terminal 411, negative dc input terminal 412, ac output phase terminal 414, neutral point 413, filter inductor 434, and filter capacitors 451, 452, and 453. Because of the limited switching speed of IGBTs 411, 414, 417, 420, 431, and 435, the voltage waveform at switching node 465 exhibits this relatively low switching frequency. Consequently, the filter elements 434, 451, 452, and 453 are large in value and size.

Key electrical elements that impact the size and weight of a string inverter are its magnetic and capacitive elements, and its efficiency which impacts the size of the heatsink and cooling system. Achieving high power density with high efficiency and low cost is a key challenge in many inverter applications.

Recently, new power transistors have become commercially available that employ wide bandgap materials such as silicon carbide (SiC) or gallium nitride (GaN) rather than silicon. These devices are able to operate with higher voltages and at higher switching speeds. For example, silicon-carbide metal-oxide field effect transistors (SiC MOSFETs) are available at rated voltages of 600 V to 10 kV, and it is possible to operate a 1200 V SiC MOSFET at switching frequencies of several hundred kHz. However, these wide bandgap transistors are significantly more expensive than the older Si IGBTs. Brute-force replacement of Si IGBTs with SiC MOSFETs in an existing string inverter can lead to an incremental improvement in efficiency, but incurs an unacceptable increase in cost. New inverter approaches are required to fully realize the needed improvements in power density, efficiency, and cost. In particular, approaches are needed that significantly reduce the cost of the reactive elements, wholly offsetting the increased cost of the SiC MOSFETs and realizing overall system cost reductions.

An additional challenge is the generation of conducted electromagnetic interference (EMI). In commercial applications, regulations typically limit the amount of EMI conducted into the utility system at frequencies above 150 kHz. Hence, a common design choice is to select the switching frequency to be below 150 kHz, so that the size of the EMI filter is reduced. It would be desirable to reduce the generation of switching-frequency current components, so that the choice of switching frequency is not constrained by the 150 kHz limit.

SUMMARY

Embodiments provided herein pertain to inverters that interface dc and ac power sources and loads. An example application is solar power systems, in which a dc source of power is an array of solar panels; the inverter converts the dc power supplied by these panels to ac power that is fed into the utility grid. Another example is battery energy storage; the inverter changes the dc power of the batteries into ac power that is fed into the grid, and also can convert (rectify) ac power from the grid for charging the batteries.

Various embodiments are provided. Example embodiments provide:
  Reduced cost in string inverters through economies of scale
  Reduced cost through a converter circuit that is optimized to minimize size and cost of magnetics, capacitors, and semiconductor devices
  Increase in string inverter power density via circuit innovations that allow operation at significantly increased switching frequencies, typically 100 kHz or above, while maintaining high efficiency and low generation of conducted electromagnetic interference (EMI)
  Manufacturability via automated means
  A modular approach that provides a path to further increases in string inverter rated power and the associated economies of scale.

In one embodiment, an inverter comprises slow switches that generate a three-level ac voltage, followed by a plurality of fast-switching half-bridges that introduce high-frequency pulse-width modulation into a plurality of ac output voltages. In one example, a switching frequency of this pulse-width modulation can be about 100 kHz or several hundred kHz. These ac output voltages are connected through high-frequency filter inductors to a common output ac phase. The pulse-width modulations of the half-bridges are phase shifted, so that the switching harmonics of the output ac phase current are reduced, reducing conducted EMI. The high frequency of the fast-switching half-bridges allows the filter inductors to be relatively small, and the reduction in current harmonics caused by the phase-shifted modulation of the half-bridges allows the filter capacitors and EMI filters to be reduced in size, thus leading to improved power density.

A control system adjusts the switching of the slow and fast switches, to control the output ac phase current waveform and magnitude. A three-phase inverter is obtained by use of three such inverter circuits, one per phase. A fourth phase may be desirable, to control the neutral point of the system. The fast-switching half-bridges may be realized using SiC MOSFETs, and the dc input power may be provided by solar photovoltaic panels.

BRIEF DESCRIPTION OF THE DRAWINGS

For a more complete understanding of the invention, reference is made to the following description and accompanying drawings, in which:

FIG. 3a includes large filter capacitors to attenuate the triple-n voltage harmonics at the dc input terminals, while FIG. 3b replaces these capacitors with a neutral point control module;

DETAILED DESCRIPTION

Figure 1:
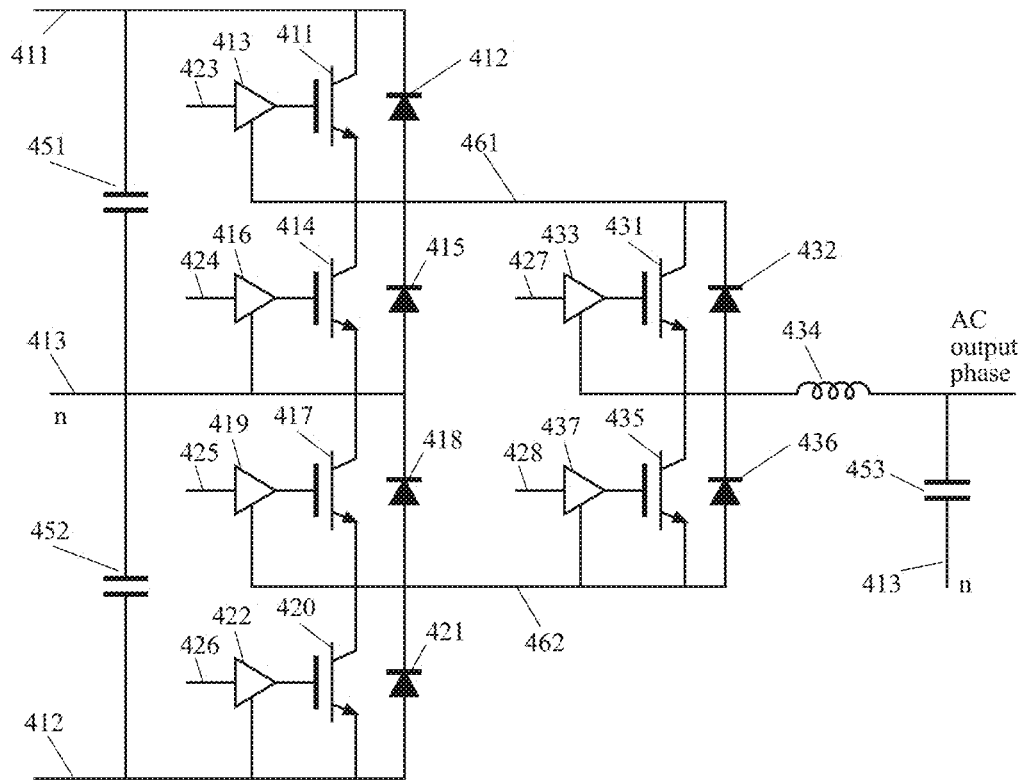
FIG. 1 is one phase of a prior art neutral-point clamped three-level inverter.
Figure 2:
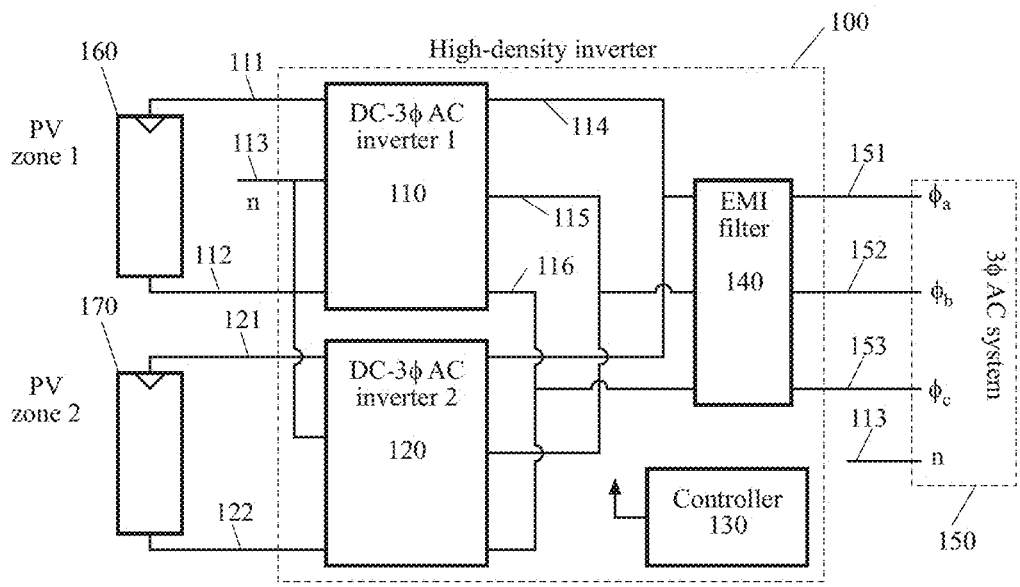
FIG. 2 is a high-level block diagram of an example inverter circuit.

FIG. 2 is a high-level block diagram of one embodiment of a high density inverter 100 for a photovoltaic string inverter application. An array of series- and parallel-connected photovoltaic panels 160 is connected to positive dc input terminal 111 and negative dc input terminal 112 at the dc input of inverter circuit 110. A neutral connection 113 is also provided for connection to the ac system neutral. Inverter 110 controls the voltages at 111 and 112 with respect to neutral 113. The inverter controller 130 may control the voltage between terminals 111 and 112 such that the PV array 160 operates at its maximum power point. Inverter 110 converts the dc input power from the photovoltaic array into three-phase output power provided to ac phases 114, 115, and 116. These phases are connected through EMI filter 140 to the three-phase ac utility system 150 and its three phases 151, 152, and 153.

High-density inverter 100 may include multiple dc input PV zones, each of which is independently controlled to achieve independent maximum power point tracking. FIG. 2 illustrates an embodiment in which high-density inverter 100 contains two input PV zones 160 and 170 connected to independent inverters 110 and 120 respectively. The ac outputs of these inverters are parallel-connected through the EMI filter 140 to the three-phase ac system 150.

Figure 3A:
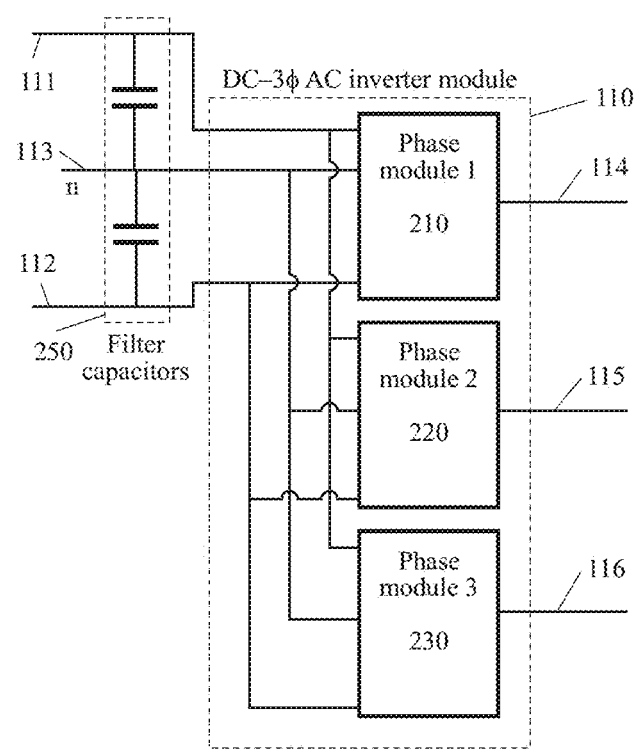
FIGS. 3a and 3b are high-level block diagrams of example three-phase inverter modules.
Figure 3B:
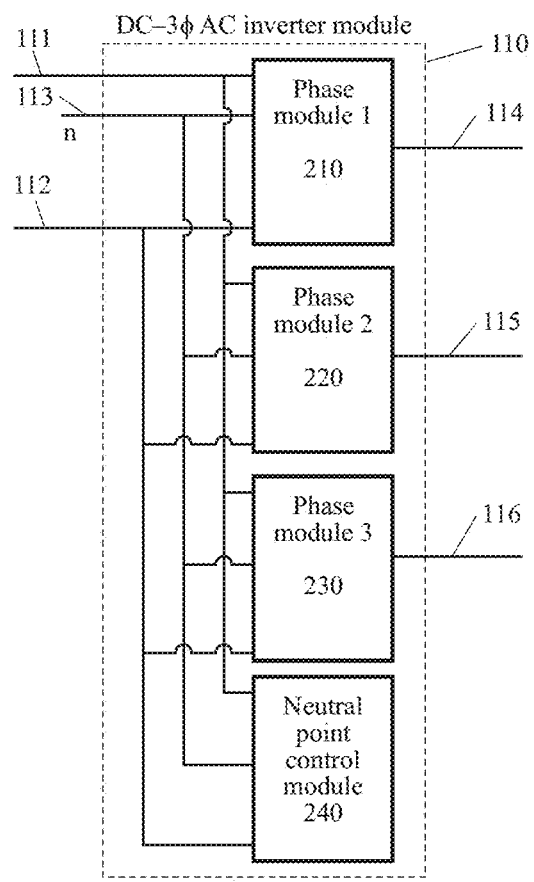

FIG. 3 illustrates two modular realizations of inverter 110. Inverter 120 and any additional inverter blocks are realized in the same way. Inverter 110 includes phase modules 210, 220, and 230, each of which produces one phase of the inverter three-phase output. Additionally, inverter 110 may include a neutral point control module 240, which controls the voltages at 111, 112 and 113, as illustrated in FIG. 3b. Module 240 also reduces the triple-n voltage harmonics that would appear at nodes 111 and 112. Alternatively, large filter capacitors 250 may be placed at the dc input terminals of inverter 110 as illustrated in FIG. 3a, to filter the triple-n harmonics at nodes 111 and 112, with controller 130 regulating these node voltages with respect to the neutral potential.

Figure 4:
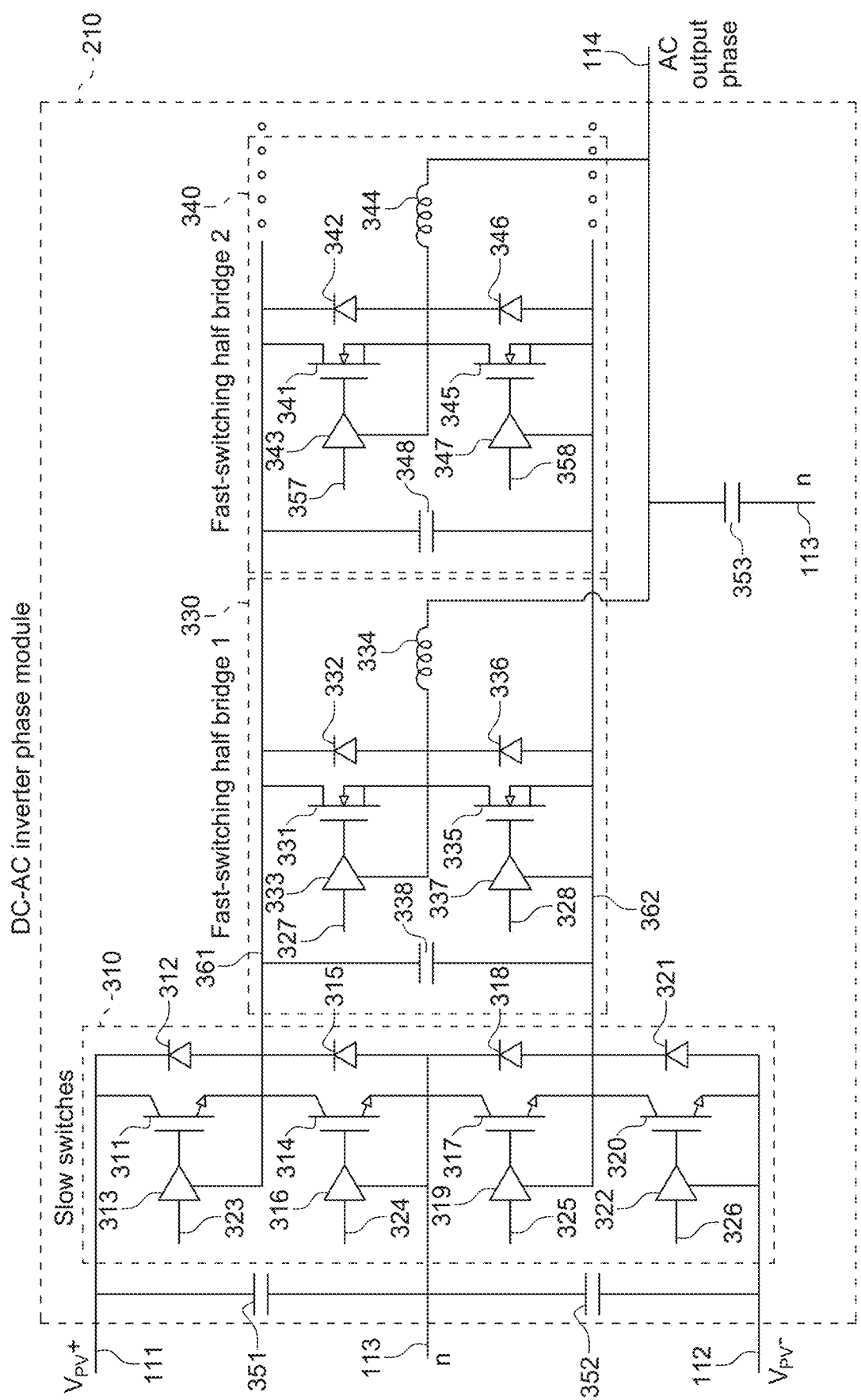
FIG. 4 is a schematic of an example single-phase inverter module.

FIG. 4 illustrates a schematic of a power stage of a phase module 210. In this embodiment, modules 220 and 230 are identical. The phase module includes dc filter capacitors 351 and 352, slow switch block 310, a plurality of fast switch blocks 330, 340, and possibly more, ac filter capacitor 353, and ac output phase 114.

Module 310 contains slow switches 311, 314, 317, and 320 that switch at the ac line frequency. FIG. 4 represents these devices as Si IGBTs; with a 60 Hz utility connection, these devices must switch at 60 Hz. When the voltage at the ac phase terminal 114 is positive with respect to neutral, then transistors 311 and 317 are turned on, while transistors 314 and 320 are turned off. Antiparallel diodes 312 and 318 may become forward biased during this time, depending on the polarity of the ac output phase current. Hence, the voltage at the positive bus 361 is equal to the positive input voltage at 111, and the voltage at the negative bus 362 is equal to the neutral potential at 113. For the purposes of this discussion, the voltage drops across conducting semiconductor devices are ignored.

When the ac output phase voltage at 114 is negative, the controller turns off devices 311 and 317, and turns on devices 314 and 320. Diodes 315 and 321 may become forward biased during this interval, depending on the polarity of the ac output phase current. During this interval, the voltage at node 361 is equal to the neutral voltage at 113, and the voltage at node 362 is equal to the negative dc input voltage at node 112. The inverter controller 130 commands this functionality through logic signals 323, 324, 325, and 326, commanding isolated gate drive circuits 313, 316, 319, and 322 to operate their respective transistors in this manner.

Fast-switching half-bridge block 330 includes transistors 331 and 335, that are capable of switching at much higher frequencies. Anti-parallel diodes 332 and 336 may be discrete fast-switching diodes, or alternatively may be the built-in body diodes of devices 331 and 335. FIG. 4 illustrates the use of SiC MOSFETs to perform this function. In one embodiment, for example, 1200 V SiC MOSFETs that can switch at frequencies in excess of 100 kHz are used. Switch node 365 is connected through filter inductor 334 to the ac output phase 114. Controller 130 also provides logic signals 327 and 328 to isolated gate drivers 333 and 337 that control the conducting states of transistors 331 and 335. When the controller commands transistor 331 to turn on and transistor 335 to be off, then the voltage at switch node 365 is equal to the bus voltage at node 361. Conversely, when the controller commands transistor 331 to be off and transistor 335 to turn on, then the voltage at switch node 365 is equal to the bus voltage at node 362. The controller employs pulse-width modulation of these signals to control the waveform of the current in inductor 334. Most commonly, the controller regulates this current to be proportional to, and in phase with, the ac voltage at the output terminal 114, leading to inversion with unity power factor. The amplitude of this ac current is also controlled; this controls the amount of power drawn out of the PV array and supplied to the ac utility. This pulse-width modulation control is also capable of adjusting the phase shift of the inductor current with respect to the ac output voltage, allowing the inverter to supply reactive power to the ac output.

Phase module 210 contains at least two parallel-connected fast switching half bridge blocks. FIG. 4 illustrates two of these having identical circuits. Controller 130 operates these with synchronized switching frequencies but with phase-shifted control. For example, in FIG. 4 the PWM logic signal supplied at 327 may exhibit a rising edge to turn on transistor 331 at the beginning of a switching period. The PWM logic signal supplied at 357 would exhibit a rising edge to turn on transistor 341 one half switching period later. This causes the switching ripples in inductors 334 and 344 to be approximately out of phase, causing some or all of the current switching harmonics to cancel at output phase terminal 114. It can be shown that this parallel phase-shifted operation of N fast-switching half-bridge blocks leads to reduction in the total ac output current by a factor of approximately N. Additionally, it reduces the rms switching current ripple in filter capacitor 353 to be reduced by a similar factor. For a given allowed output current ripple, the sizes of the inductors and/or filter capacitors can be reduced accordingly.

Figure 5:
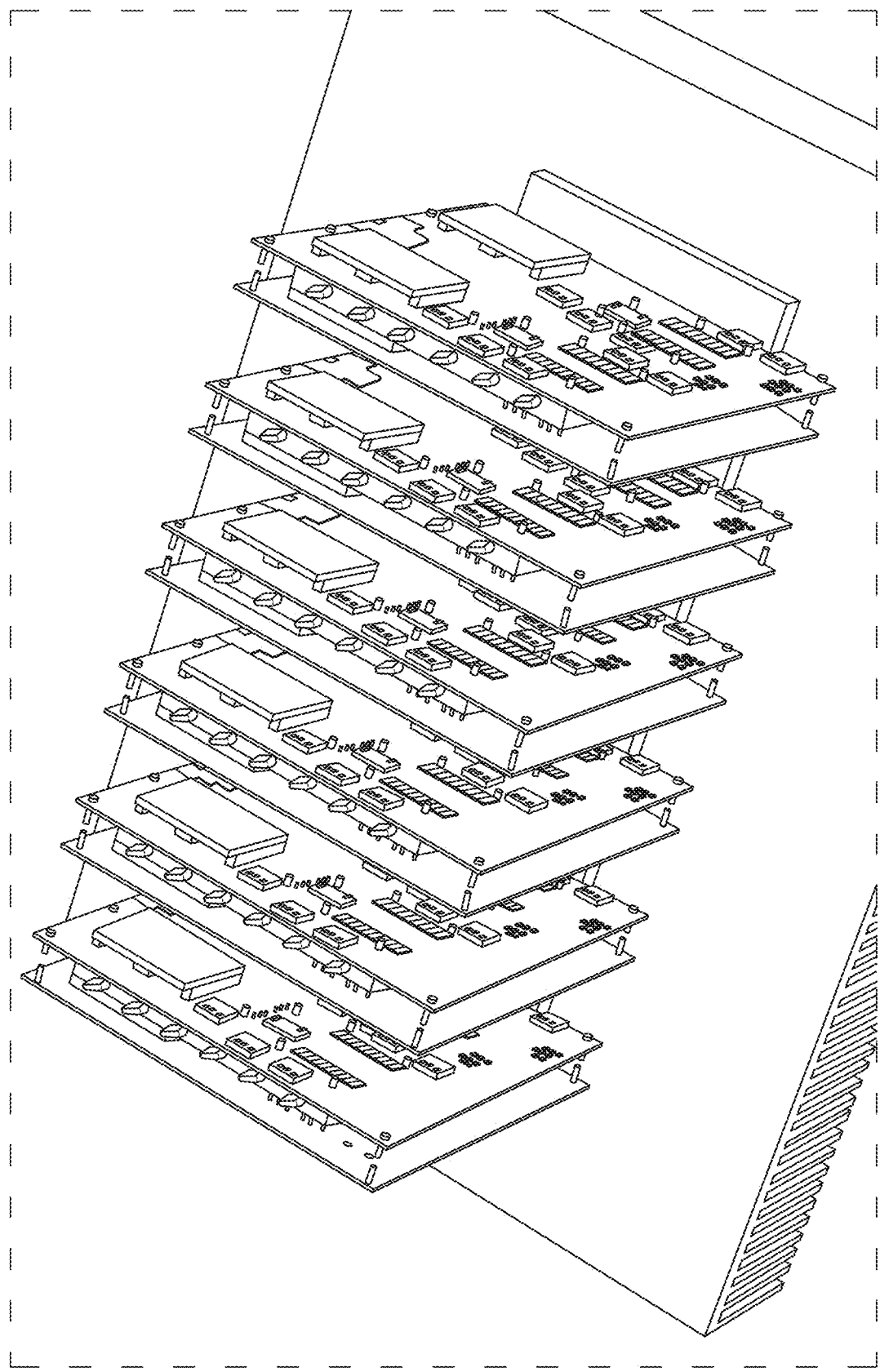
FIG. 5 is a drawing of the assembly of an example modular inverter system, in which each PCB contains a single-phase inverter module including its planar magnetics.

FIG. 5 is a drawing of an assembly of the electronics of an example high density inverter system. In this embodiment, each PCB contains a phase module such as 210, including its planar magnetics and ceramic capacitors. These PCBs are mounted onto cold plates that conduct heat to a system heat sink. This drawing depicts a total of 12 PCBs which comprise three three-phase inverter modules such as FIG. 3.

Figure 6:
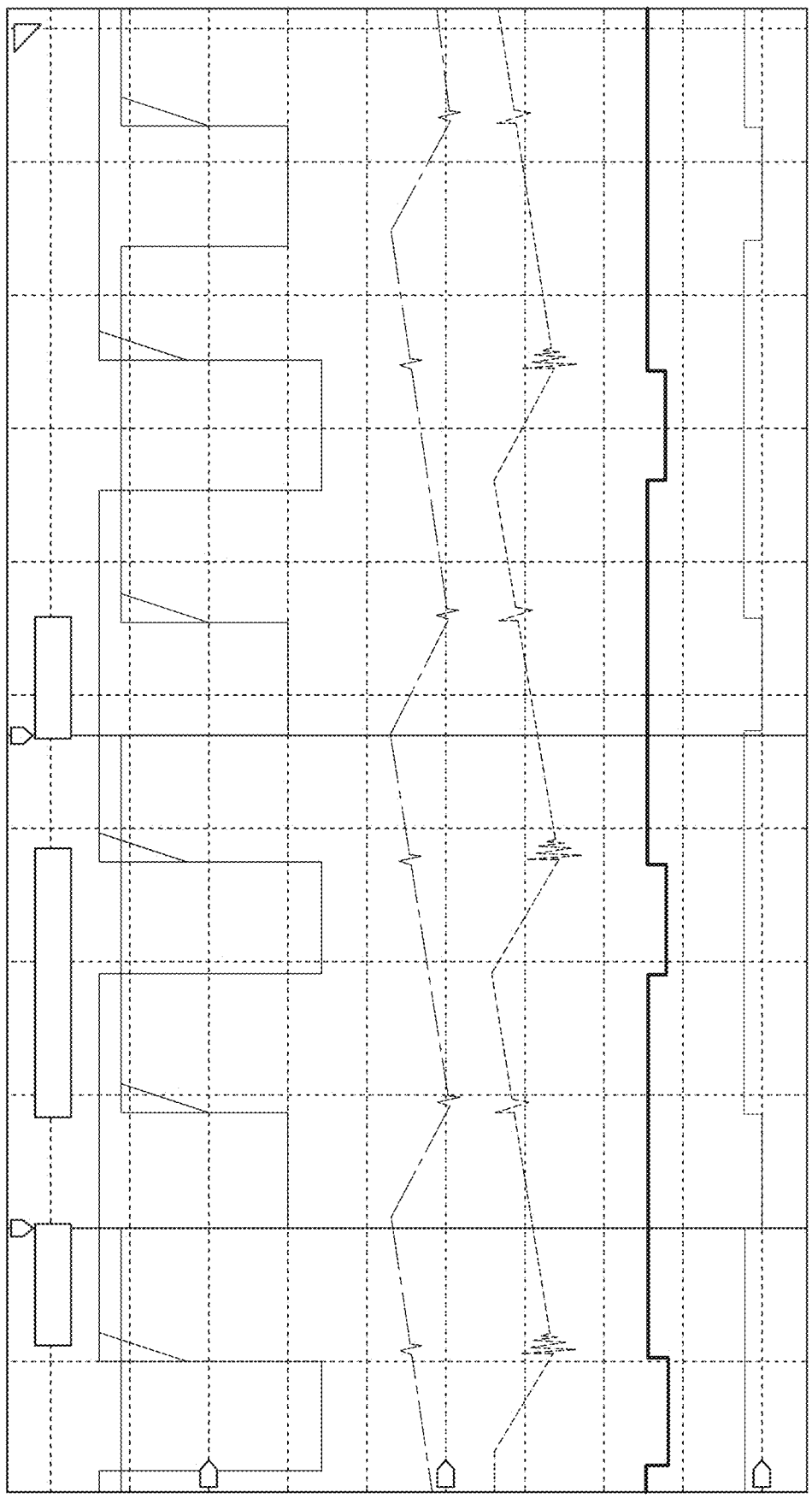
FIG. 6 contains measured waveforms of example parallel phase-shifted fast-switching half-bridge blocks.

FIG. 6 illustrates measured waveforms for two parallel-connected fast switching half bridge blocks, operating at 300 kHz with phase shift as described above. The bottom two traces measure the gate drive logic signals 327 and 357. The two middle traces are the resulting current waveforms for inductors 334 and 344; it can be seen that the switching ripples are similar in shape but are phase shifted with respect to each other. The top two traces are switch node voltages.

In one embodiment, dc-ac inverter phase module 210 is rated at 42 kW, and is fabricated on a single printed circuit board (PCB). The PV input voltage between terminals 111 and 112 is rated at up to 1500 V dc. Slow switches 311, 314, 317, and 320 are Si IGBTs rated at 1200 V. Fast switching transistors 331 and 335 are SiC MOSFETs rated at 1200 V, having on resistance 40 mΩ, and operating at 300 kHz switching frequency. The body diodes of these MOSFETs are used, and so no additional antiparallel diodes are added. Inductor 334 is realized using planar magnetics, integrated into the printed circuit board. Phase module 210 contains four identical fast-switching half bridge blocks of the type illustrated at 330. Each planar inductor 334 employs an EILP ferrite planar core using Epcos material N97; its winding is comprised of four turns that each are one layer in the PCB using two ounce copper. The planar core is gapped to obtain an inductance of 15 μH.

The currents drawn at the input terminals of phase modules 210, 220, and 230 contain not only dc components, but also components at the triple-n multiples of the ac line frequency (e.g., 360 Hz for a 60 Hz line frequency). These low-frequency current harmonics are filtered so that they do not significantly disrupt the voltage applied to the input photovoltaic array. One way to do this is to connect large filter capacitors 250 across the dc input terminals of the PV zone, as illustrated in FIG. 3a. These capacitors provide a low impedance path for flow of the triple-n current harmonics. Additionally, the positive and negative voltages of the PV array can be controlled with respect to the neutral terminal; this can be done by control of the inverter input currents. Alternatively, a neutral-point control module 240 can be employed as illustrated in FIG. 3b. This module provides a path for circulation of the triple-n current harmonics, and can control the neutral point voltage and/or the relative values of the positive and negative dc input voltages. The reactive elements of this module can be significantly smaller than those of filter 250.

Figure 7:
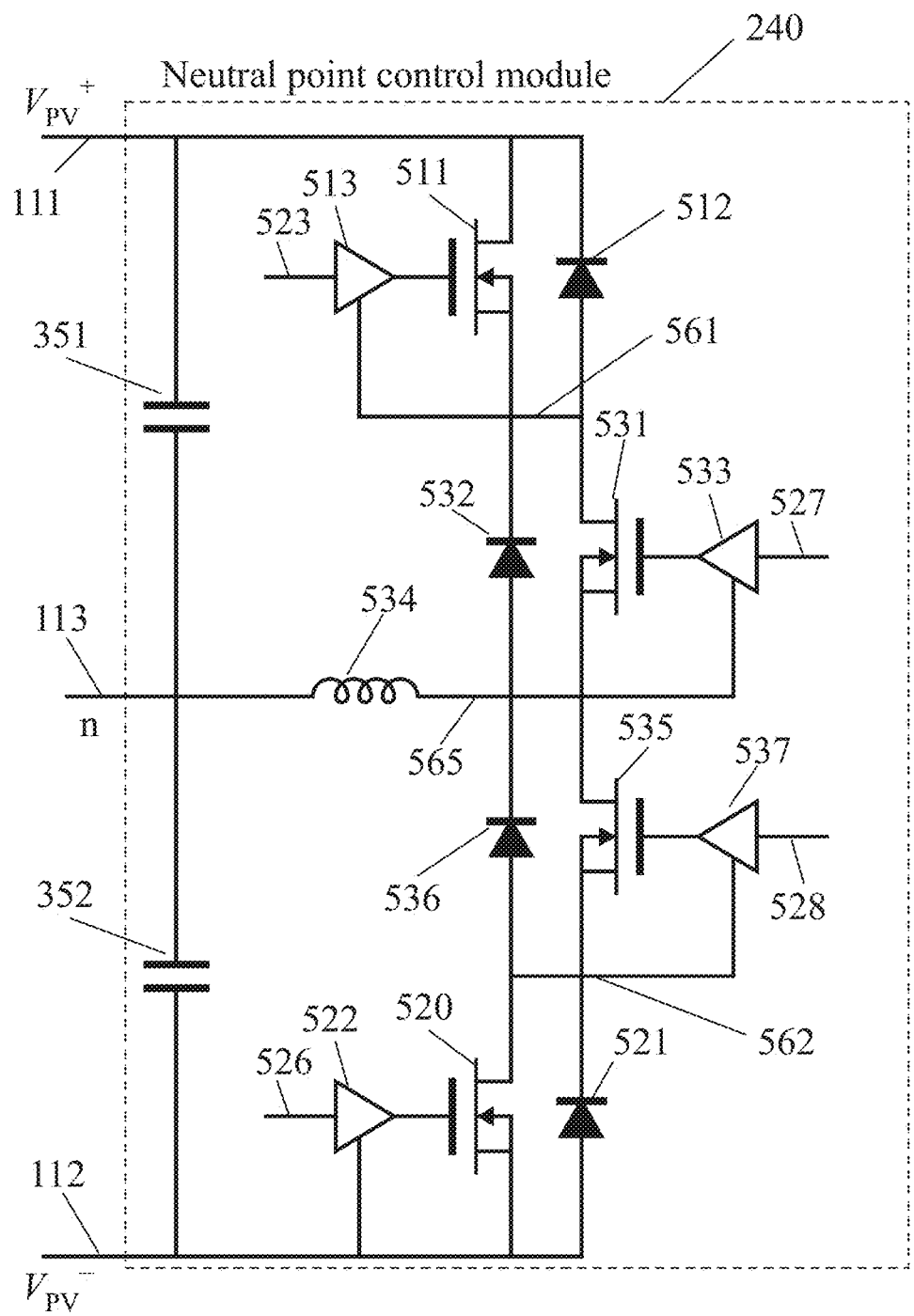
FIG. 7 is a schematic of an embodiment of a neutral point control module.

FIG. 7 is an embodiment of a neutral point control module 240. In this embodiment, the module includes fast switches 511, 531, 535, and 520, which may be realized using the same SiC MOSFETs used in module 210. These transistors are switched according to logic signals 523, 527, 528, and 526 received from controller 130, which command isolated gate drivers 513, 527, 537, and 522 to control the conducting states of the transistors. Diodes 515 and 518 ensure that the voltages blocked by the transistors do not exceed the voltages on capacitors 351 and 352, respectively. Controller 130 adjusts the transistor duty cycles to regulate the voltages across capacitors 351 and 352 to be equal. In a first interval during the switching period, transistors 511 and 531 are in the on state, and transistors 535 and 520 are in the off state. Inductor 534 is connected between terminals 111 and 113. In a second interval during a switching period, transistors 511 and 531 are in the off state, and transistors 535 and 520 are in the on state; inductor 534 then is connected between terminals 112 and 113. The switching transitions can be accomplished sequentially, in which an outer transistor is turned off first, followed by the respective inner transistor. In the turn-on transition, the inner transistor is turned on first, followed by the outer transistor. Short dead times are inserted between transitions.

Figure 8:
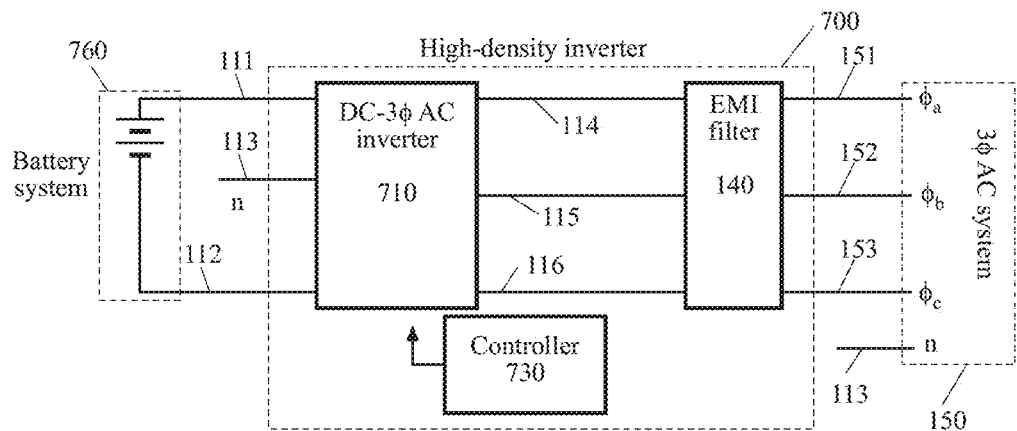
FIG. 8 is a high-level block diagram of an example system that interfaces a bank of batteries to the utility grid.
Figure 9:
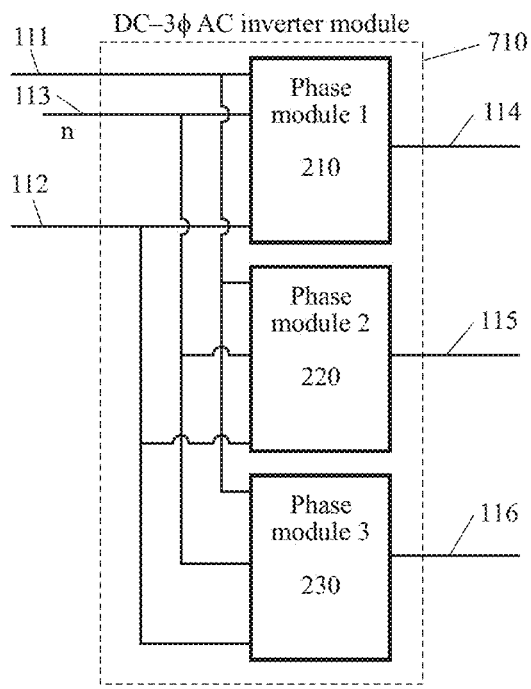
FIG. 9 is a high-level block diagram of one three-phase inverter module of an embodiment for interfacing a battery bank to the utility grid.

The high-density inverter circuitry of FIG. 4 could be employed in other applications as well. FIG. 8 is an example of a high density inverter system that interfaces a system of energy storage batteries to the utility grid. Inverter 700 is capable of bidirectional power flow, as needed for both charging and discharging of the battery system. Inverter 710 can drive the utility grid either at unity power factor, or with less than unity power factor to supply reactive power to the grid. FIG. 9 contains a block diagram of one embodiment of inverter block 710, employing the inverter phase modules of FIG. 4 or FIG. 10. A neutral point control module 240 can also be incorporated, as in FIG. 3b. Controller 730 produces gate drive logic signals as previously described, and additionally implements battery charge and discharge algorithms.

Referring to FIG. 4, the fast-switching half bridge modules 330, 340, . . . , inject high-frequency currents into the intermediate busses 361 and 362. These currents contain harmonics of the fast-switching half bridge switching frequency fs. For example, if phase module 210 includes four fast-switching half bridge modules that are phase shifted by times 0, Ts/4, Ts/2, and 3Ts/4 respectively, where Ts is the switching period Ts=1/fs, then the total bus current will have a frequency of 4fs and its harmonics. For a switching frequency of fs=300 kHz, the bus current will have fundamental frequency 4fs=1.2 MHz. The peak magnitude of this current is equal to the peak magnitude of an inductor current.

This injected bus current divides between two paths. It can flow through the nearby filter capacitors 338, 348, . . . , or it can flow through the slow switching IGBT network 310 and the dc input filter capacitors 351 and 352. The current divides according to the relative impedances of the two paths.

Figure 10:
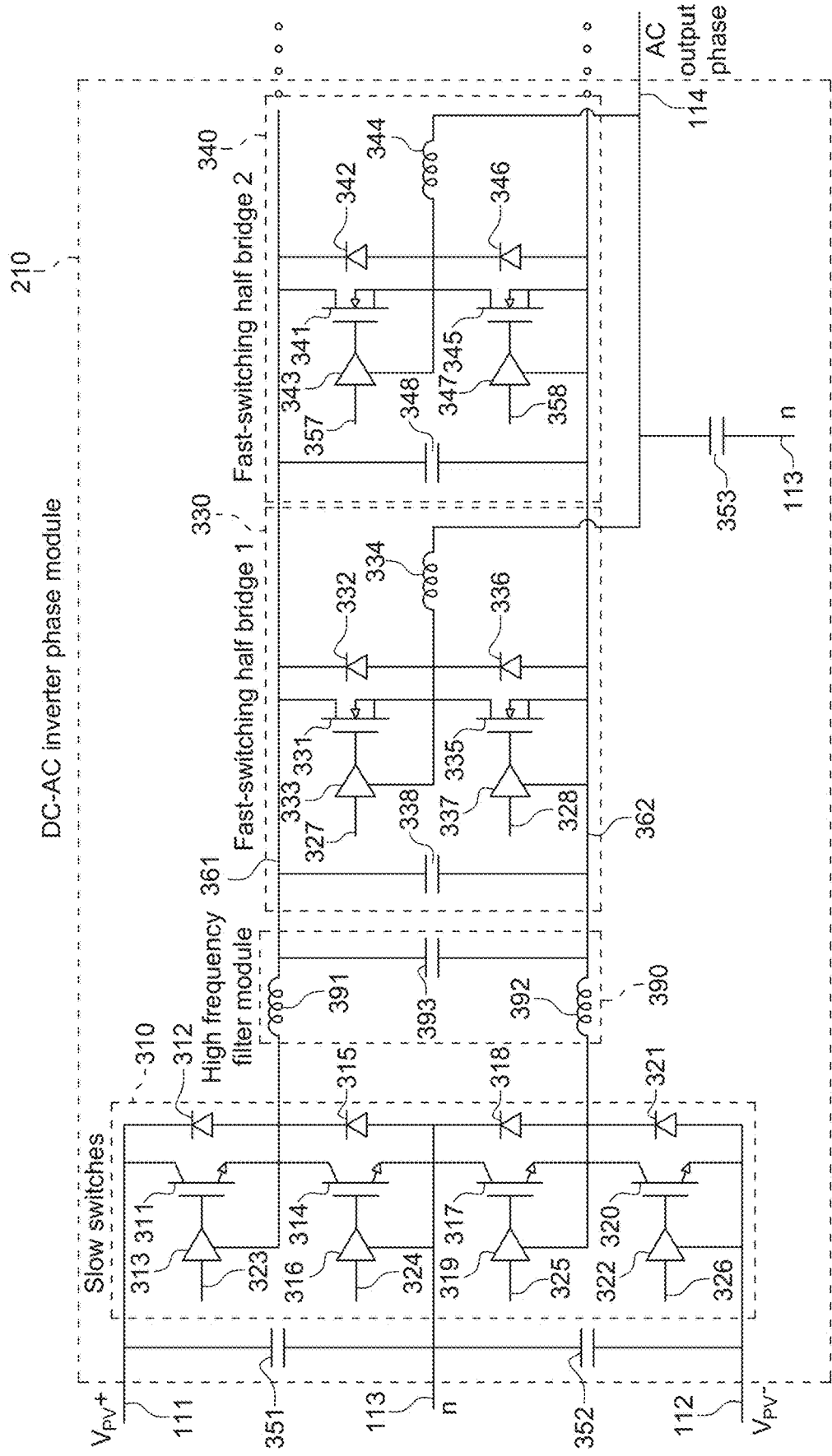
FIG. 10 is another example embodiment of a single-phase inverter module, in which additional filtering is added to reduce the high-frequency currents applied to the IGBTs.

It can be inadvisable to impose such high-frequency currents on the high-frequency IGBT devices. For example, the designer of a 10 kHz IGBT does not anticipate that they will conduct 1.2 MHz currents of high amplitude, and data sheets of such IGBTs do not address this situation. Indeed, we have observed laboratory failures under such circumstances. This suggests that a low-pass filter can be used to sufficiently reduce the magnitude of high-frequency currents applied to the IGBT devices. FIG. 10 illustrates a solution in which high-frequency filter module 390 is inserted between the slow-switching IGBT module 310 and the fast-switching half-bridge modules 330, 340, . . . . This module includes inductors 391 and 392 which significantly reduce the amount of high-frequency current ripple that is imposed on slow-switching module 310; the high-frequency currents are contained to flow through capacitors 393, 338, 348, . . . . Reliable operation of the IGBT devices can then be achieved. The high-frequency filter module 390 effectively decouples the fast-switching half bridges 330, 340, . . . and their control from the switching of the slow-switching module 310. The control of these modules is effectively decoupled, and can be independently optimized.

Figure 11:
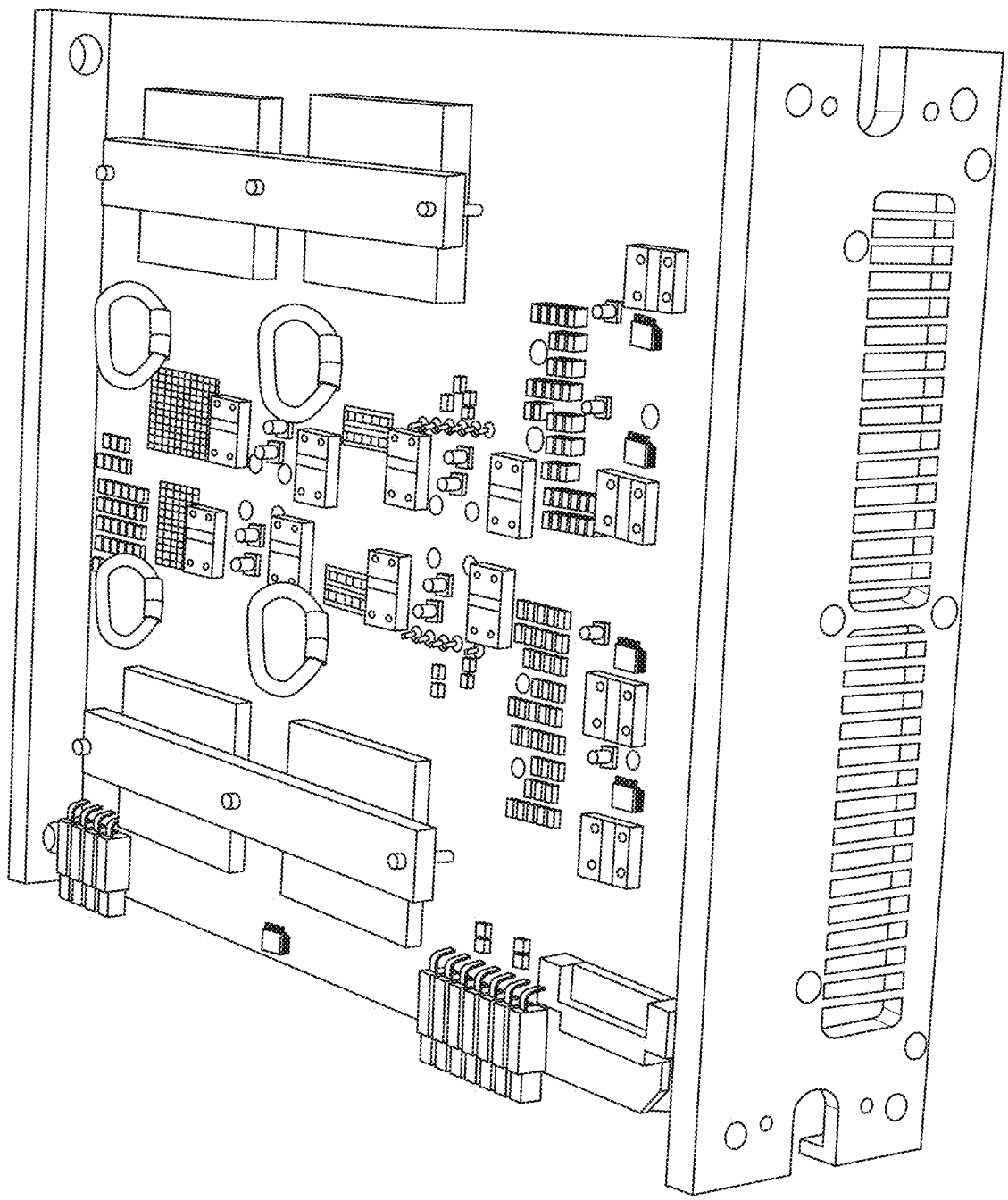
FIG. 11 is a photograph of a realized laboratory 42 kW single-phase inverter module.

FIG. 11 contains a photograph of an experimental realization of a DC-AC inverter phase module 210 that is rated 42 kW. This phase module includes slow-switching module 310, and four fast-switching half bridge modules 330, 340, . . . . The module operates with a dc PV input voltage of up to 1500 V, and produces one phase of the 50/60 Hz three-phase 600 V rms output. Inductors 334, 344, . . . , are realized as planar magnetics integrated into the printed circuit board, and can be seen on the upper left and lower left sides of the photograph. Beneath the printed circuit board is a heatsink, and the power IGBTs and SiC MOSFETs are mounted underneath the printed circuit board. Gate driver circuitry and ceramic capacitor filter circuitry can be seen on the top of the printed circuit board. All capacitors of the DC-AC inverter phase module 210 are realized as ceramic capacitors placed on this board. High-frequency filter module 390 is mounted on the bottom side of this printed circuit board; inductors 391 and 392 are realized using surface-mounted power inductors.

Figure 12:
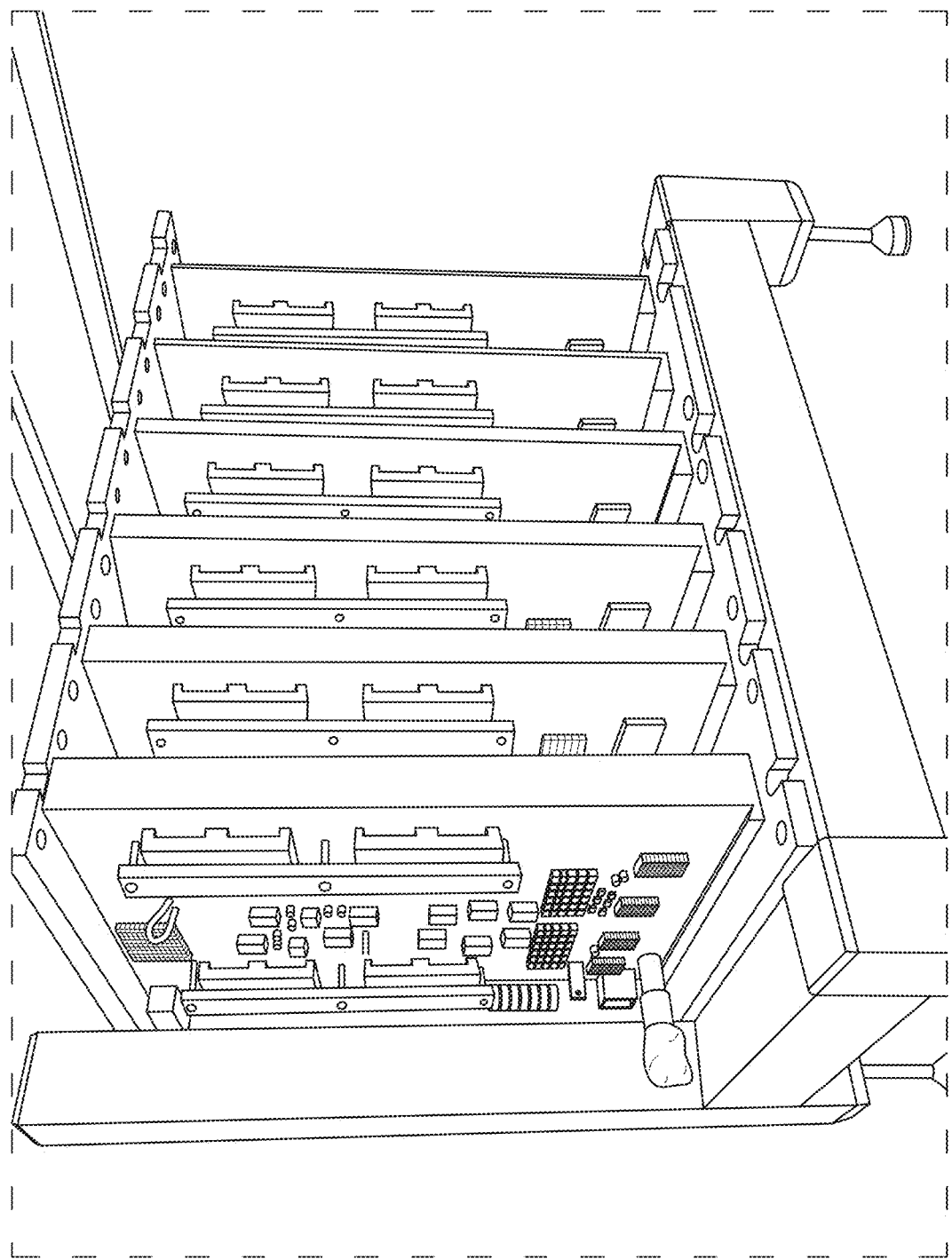
FIG. 12 is a photograph of a laboratory 250 kW inverter system, comprising six 42 kW single-phase modules connected to a common backplane.

FIG. 12 illustrates a 250 kW inverter prototype constructed in our laboratory. Six 42 kW DC-AC inverter phase modules are plugged into a power backplane that interconnects the phase modules to the dc photovoltaic source and to the ac three-phase output as in FIG. 8. The backplane includes controller 130 and EMI filter 140 as illustrated in FIG. 2 to realize high-density inverter system 100. Three of the inverter phase modules combine to realize a DC-3phase AC inverter and PV zone rated at 125 kW, and the other three phase modules combine to realize a second 125 kW inverter and PV zone. The inverter ac outputs are parallel connected as illustrated in FIG. 2, to provide an ac output power totaling 250 kW.

Figure 13:
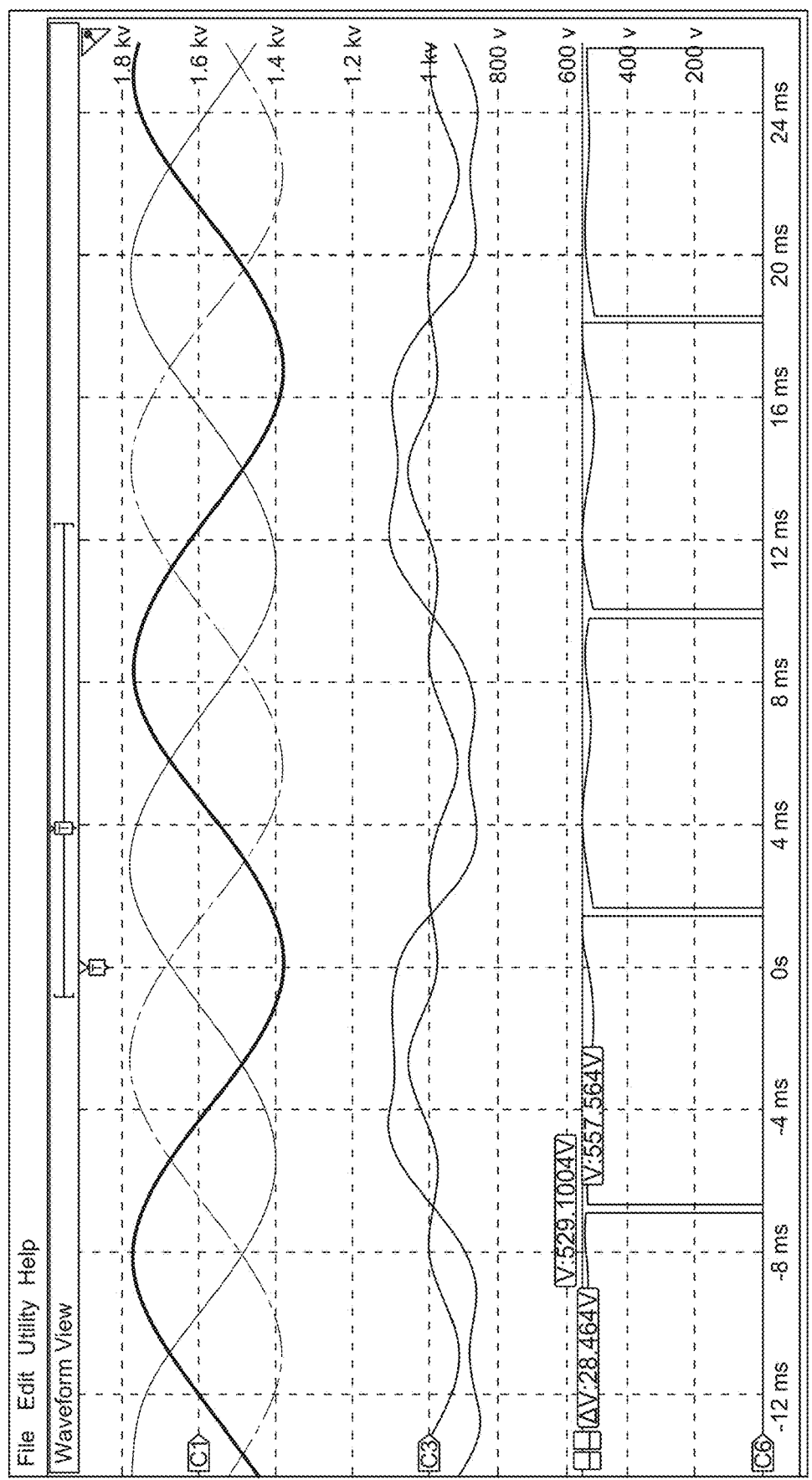
FIG. 13 is an oscilloscope graph of operating waveforms of a 125 kW inverter system comprising three 42 kW single-phase modules operating together to produce a 600 V three-phase ac output at 125 kW. In this example, the three-phase sinusoidal output voltages are shown at top. The center waveform is the inductor current of one SiC MOSFET module of one of the inverters. The lower waveform is the pulse-width modulated switch node voltage of one SiC MOSFET module.

FIG. 13 illustrates ac operating waveforms of a 125 kW PV zone, operating with a dc input voltage of 1050 V and a three-phase ac output line-line voltage of 600 V rms. The top waveforms are the ac output line-neutral voltages, operating at 60 Hz. The middle waveform is the inductor current of one of the fast-switching half-bridge modules of one inverter phase module. This inductor current includes the 60 Hz ac output for this half-bridge module, plus an envelope that is caused by the superimposed high-frequency switching ripple of the inductor current. In this prototype, the half-bridge switching frequency varies between 150 kHz and 300 kHz along the ac output waveform. The bottom trace is the half-bridge switch node voltage 365; this is a pulse-width modulated rectangular waveform whose duty cycle and switching frequency vary along the ac sine wave such that the desired low-frequency sinusoidal component of current is achieved.

Variation of the switching frequency between 150 kHz and 300 kHz allows further optimizations of the system efficiency: for the positive half of the line cycle, switching energy loss is reduced by causing the minimum of the current envelope to be negative (leading to zero-voltage switching) or positive but small, while conduction loss is increased when the maximum of the current envelope is large. Saturation of the inductor also limits the practical maximum of the current envelope. The size of the current envelope can be increased by decreasing the switching frequency. Hence at a given point on the line current waveform, there is a choice of switching frequency that minimizes loss while avoiding inductor saturation, and this switching frequency varies along the sine wave. In this prototype, the switching frequency is 150 kHz at the peak of the sine wave, and 300 kHz at the zero crossing of the sine wave. The switching frequency varies along the sine wave between these extremes, in proportion to the ac line voltage.

Figure 14:
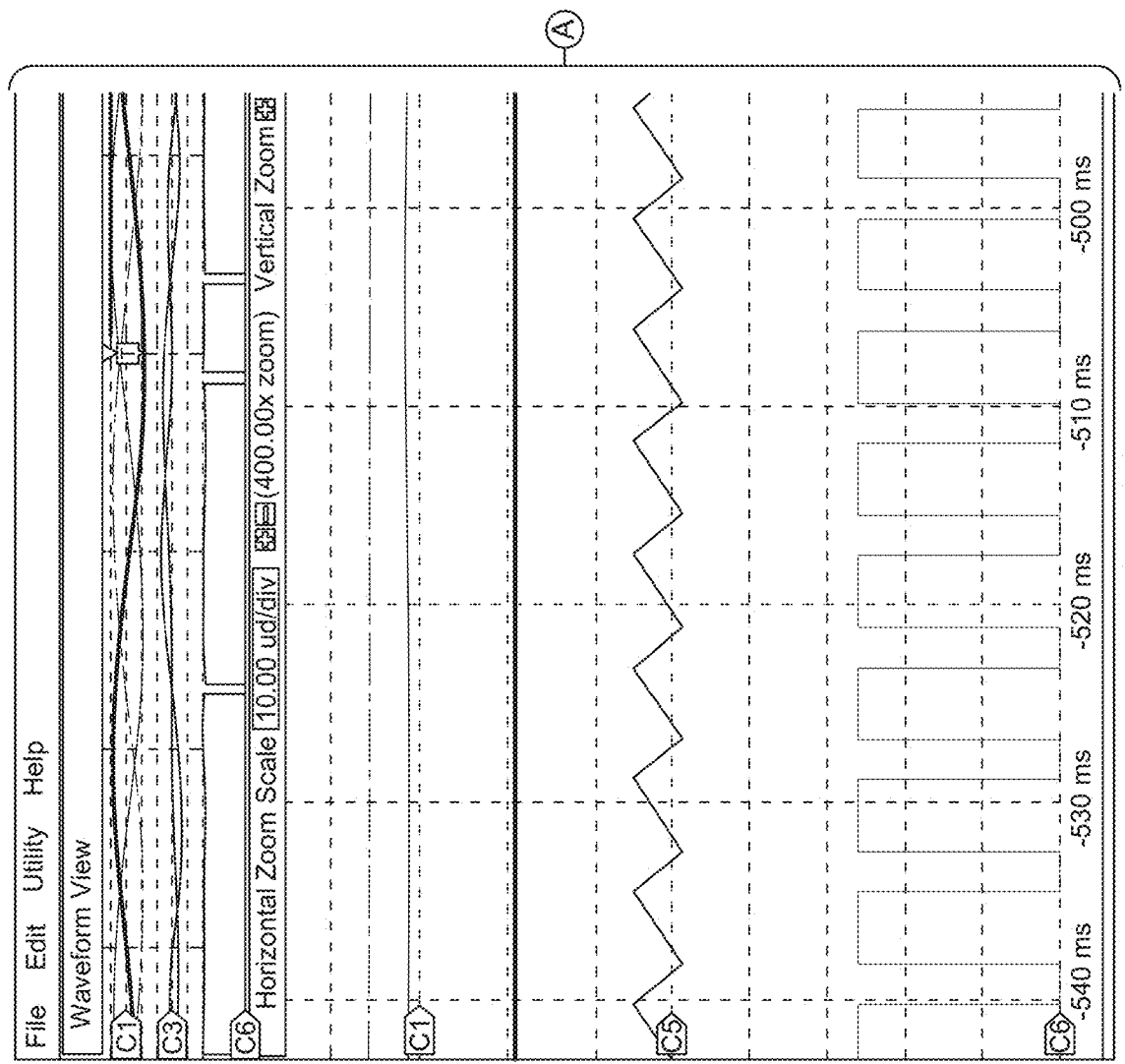
FIG. 14 is a magnified view of the waveforms of FIG. 13, including the sawtooth-shaped inductor current waveform and the pulse-width modulated switch node voltage waveform.
Figure 14:
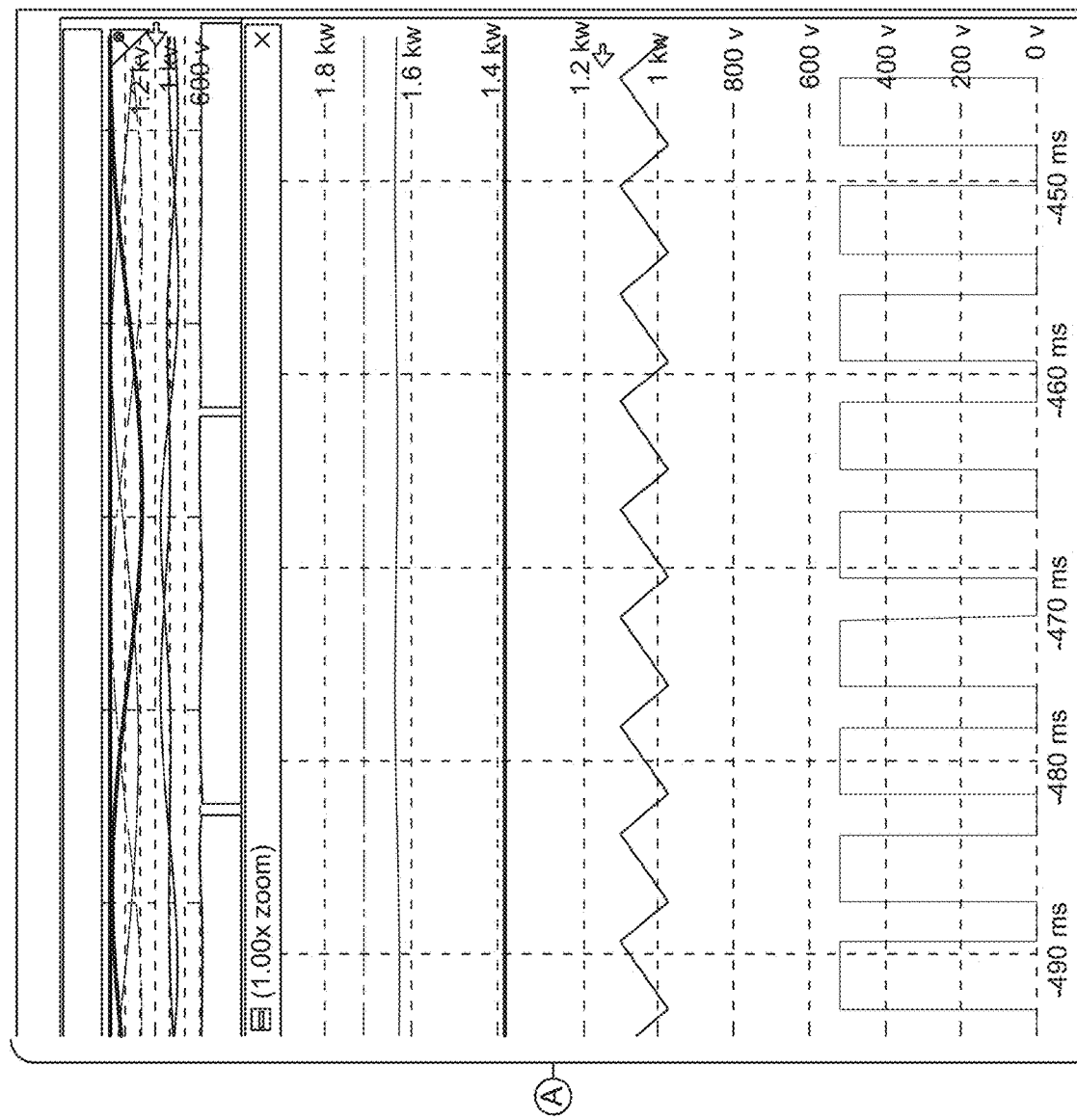

FIG. 14 contains a magnified view of the waveforms of FIG. 13, for a portion of time between the peak and zero crossings of the ac line voltage. In this view, the switch node voltage waveform (bottom) can be seen more clearly including its pulse-width modulated nature. The inductor current also can be clearly seen to contain the low-frequency (average) component plus the high-frequency switching ripple.

Figure 15:
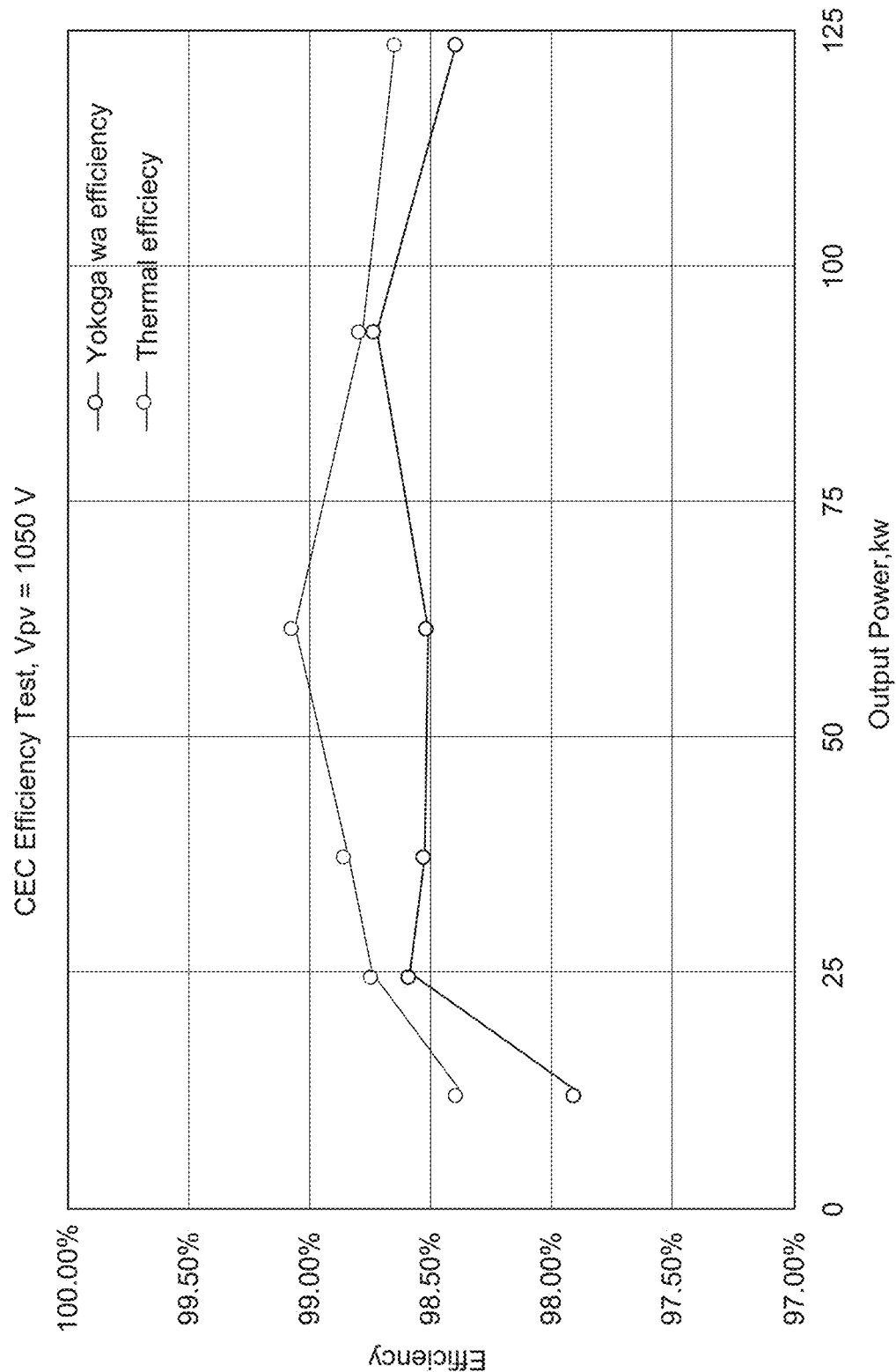
FIG. 15 is measured efficiency data of a 125 kW inverter prototype.

FIG. 15 illustrates measured efficiency data for this 125 kW prototype. These measurements are made at a fixed dc input voltage of 1050 V, and a fixed three-phase ac output of 60 Hz 600 V rms line-line. Most efficiency points lie within the range 98.5% to 99.0%.

The use of multiple parallel-connected half-bridge fast switching modules allows 330, 340, . . . , allows further system efficiency improvements. At low power, phase shedding can be employed, in which the efficiency is improved by shutting down one or more of the fast switching half-bridge modules. This easily can be achieved through programming of the central controller. In the efficiency data of FIG. 15, the low power points at 12.5 kW were obtained by operating only one of the four fast-switching half-bridge modules per phase module. Since MOSFET switching loss and inductor ac losses are only weakly dependent on output current, shutting down one or more half-bridge modules at low current improves system efficiency. Likewise, the 25 kW data points were obtained by operating two of the four half-bridge modules per phase. At the higher power points, all four half-bridge modules operated in each phase module. Hence, the controller is programmed to shut down half-bridge modules at low power conditions such that system efficiency is improved.

In the experimental prototype, each fast switching half-bridge such as 330 includes planar inductor 334, realized using an EILP 64 ferrite planar core (Epcos EILP 64/10/50 N49). The winding of the inductor comprises six turns, realized in the six layer printed circuit board having copper with 3 oz weight. An inductor air gap is included such that the total inductance is 12 uH. Silicon Carbide MOSFETs 331 and 335 are Cree C3M0032120K devices rated 32 milliohms on-resistance and 1200 V. Diodes 332 and 336 are the built-in body diodes of MOSFETs 331 and 335. Fast-switching SiC MOSFET gate drivers 333 and 337 are isolated gate drivers TI UCC5390, rated 10 A and 3 kV isolation, and these are powered by small isolated power supplies. The IGBTs 311, 314, 317, and 320 are Microsemi APT 100GN120B2G. To limit the temperature rise of these devices, two such IGBTs were paralleled for devices 311 and 320. Slow-switching diodes 312, 315, 318, and 321 are discrete rectifier devices IXYS DSEI120/12A rated 120 A at 1200 V. The filter capacitors such as elements 338, 351, and 352, were realized using multiple parallel-connected multi-layer ceramic capacitors rated 1000 V, 0.1 uF X7R, such as Kemet C1812C104KDRACTU, leading to total bus capacitances of 12 uF each.

Although implementations have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. A multiphase dc-ac inverter comprising:
   a neutral terminal;
   a first dc input terminal;
   a second dc input terminal;
   a plurality of dc-ac inverter phase modules; and
   neutral point controller,
   wherein each of the dc-ac inverter phase modules comprises:
      a slow switch module coupled across the neutral terminal, the first dc input terminal and the second dc input terminal, the slow switch module comprising a plurality of switches that switch at a first frequency;
      plurality of fast switch modules arranged in a parallel configuration and coupled to an output of the slow switch module; each of the plurality of fast switch modules comprising a pair of transistors switching at a second switching frequency greater than the first frequency, each of the plurality of fast switch modules coupled to a respective ac output terminal; and
      an inverter controller configured to provide logic signals to control an operation of the pair of transistors of each of the plurality of fast switch modules, and
   wherein the neutral point controller is configured to regulate a voltage at the neutral terminal relative to the first and second dc terminal voltages, the neutral point controller comprises a first fast switch half-bridge module and a second fast-switch half-bridge module, wherein a first voltage across the first fast switch half-bridge module is limited to a voltage across the first dc input terminal and the neutral terminal and a second voltage across the second fast switch half-bridge module is limited to a voltage across the neutral terminal and the second dc input terminal, the neutral point controller configured to provide logic signals to control an operation of the first fast switch half-bridge module and the second fast switch half-bridge module.

2. The inverter phase module of claim 1 wherein the plurality of fast switch modules comprises a plurality of fast switch half-bridge modules.

3. The inverter phase module of claim 1 wherein a filter capacitor is disposed between the slow switch module and each of the plurality of fast switch modules.

4. The inverter phase module of claim 1 wherein each of the plurality of fast switch modules are phase shifted with respect to the other fast switch modules.

5. The inverter phase module of claim 1 wherein the first frequency comprises a frequency within plus or minus 20 percent of a line frequency of an ac output of the dc-ac inverter phase module.

6. The inverter phase module of claim 1 wherein a filter module is disposed between the slow switch module and the plurality of parallel-coupled fast switch modules.

7. The inverter phase module of claim 6 wherein the filter module comprises a low pass filter.

8. The inverter phase module of claim 6 wherein the filter module isolates relatively higher switching frequencies of the plurality of fast switch modules from the slow switch module.

9. The inverter phase module of claim 1 wherein the neutral point controller is combined with or separate from at least one of the inverter controllers.

10. A multi-phase interleaved ac-dc inverter comprising:
a neutral terminal;
a first dc input terminal;
a second dc input terminal;
a first phase module stage coupled to the first and second dc input terminals and configured to provide a first phase output of the multi-phase interleaved ac-dc inverter, the first phase module comprising:
a first slow switch module coupled across the neutral terminal, the first dc input terminal and the second dc input terminal, the slow switch module comprising a plurality of switches that switch at a first frequency, and a first plurality of fast switch modules arranged in a parallel configuration and coupled to an output of the slow switch module; each of the plurality of fast switch modules comprising a pair of transistors switching at a second switching frequency greater than the first frequency;
a second phase module stage coupled to the first and second dc input terminals and configured to provide a second phase output of the multi-phase interleaved ac-dc inverter, the second phase module comprising:
a second slow switch module coupled across the neutral terminal, the first dc input terminal and the second dc input terminal, the slow switch module comprising a plurality of switches that switch at a third frequency; and a second plurality of fast switch modules arranged in a parallel configuration and coupled to an output of the slow switch module; each of the plurality of fast switch modules comprising a pair of transistors switching at a fourth switching frequency greater than the third frequency; and
a controller configured to provide logic signals to control an operation of transistors of each of the first and second pluralities of fast switch modules.

11. The inverter of claim 10 wherein the inverter further comprises a third phase module stage coupled to the first and second dc input terminals and configured to provide a third phase output of the multi-phase interleaved ac-dc inverter, the third phase module comprising:
a third slow switch module coupled across the neutral terminal, first dc input terminal and the second dc input terminal, the slow switch module comprising a plurality of switches that switch at a fifth frequency; and a third plurality of fast switch modules arranged in a parallel configuration and coupled to an output of the slow switch module; each of the plurality of fast switch modules comprising a pair of transistors switching at a sixth switching frequency greater than the fifth frequency.

12. The inverter of claim 11 wherein the controller provides logic signals to control an operation of transistors of each of the third plurality of fast switch modules.

13. The inverter of claim 10 wherein the first and third frequencies are equal and are within plus or minus 20 percent of a line frequency of an ac output of the multi-phase interleaved ac-dc inverter.

14. The inverter of claim 10 wherein the plurality of fast switch modules comprises a plurality of fast switch half-bridge modules.

15. The inverter of claim 10 wherein a filter capacitor is disposed between the slow switch module and each of the plurality of fast switch modules.

16. The inverter of claim 10 wherein each of the plurality of fast switch modules are phase shifted with respect to the other fast switch modules.

17. The inverter of claim 10 wherein a filter module is disposed between the first slow switch module and the first plurality of parallel-coupled fast switch modules.

18. The inverter of claim 17 wherein the filter module comprises a low pass filter.

19. The inverter of claim 17 wherein the filter module isolates relatively higher switching frequencies of the first plurality of fast switch modules from the first slow switch module.

20. The inverter of claim 17 wherein a second filter module is disposed between the second slow switch module and the second plurality of parallel-coupled fast switch modules.

21. The inverter of claim 20 wherein a third filter module is disposed between the third slow switch module and the third plurality of parallel-coupled fast switch modules.

22. A method of controlling a multiphase dc-ac inverter comprising:
providing a dc-ac inverter phase module comprising:
a neutral terminal;
a first dc input terminal;
a second dc input terminal;
a plurality of dc-ac inverter phase modules; and
neutral point controller,
wherein each of the dc-ac inverter phase modules comprises:
a slow switch module coupled across the neutral terminal, first dc input terminal and the second dc input terminal, the slow switch module comprising a first plurality of switches;
a plurality of fast switch modules arranged in a parallel configuration and coupled to an output of the slow switch module; each of the plurality of fast switch modules comprising a second plurality of switches,
wherein the neutral point control module comprises a first fast switch half-bridge module and a second fast-switch half-bridge module, wherein a first voltage across the first fast switch half-bridge module is limited to a voltage across the first dc input terminal and the neutral terminal and a second voltage across the second fast switch half-bridge module is limited to a voltage across the neutral terminal and the second dc input terminal;
controlling the first plurality of switches to switch at a first frequency;
controlling the second plurality of switches to switch at a second frequency greater than the first frequency; and
controlling the neutral point control module to regulate a voltage at the neutral terminal relative to the first and second dc terminal voltages.

23. The method of claim 22 wherein each of the plurality of fast switch modules are phase shifted with respect to the other fast switch modules.

* * * * *